United States Patent
Cook

(10) Patent No.: US 11,841,217 B2
(45) Date of Patent: Dec. 12, 2023

(54) WFOV BACKWARD-PROPAGATING ACTIVE-TO-PASSIVE AUTOALIGNMENT SYSTEM

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

(*) Notice: Subject to any disclaimer, the term of this patent is extended or adjusted under 35 U.S.C. 154(b) by 386 days.

(21) Appl. No.: 17/166,730

(22) Filed: Feb. 3, 2021

(65) Prior Publication Data
US 2022/0244044 A1   Aug. 4, 2022

(51) Int. Cl.
*G01C 1/06* (2006.01)
*G01B 11/27* (2006.01)
*G01S 7/497* (2006.01)

(52) U.S. Cl.
CPC .......... *G01B 11/272* (2013.01); *G01S 7/4972* (2013.01)

(58) Field of Classification Search
None
See application file for complete search history.

(56) References Cited

U.S. PATENT DOCUMENTS

| 7,333,181 B1* | 2/2008 | Scott | G01S 3/781 257/E31.115 |
| 2012/0292482 A1* | 11/2012 | Cook | G01S 17/42 359/846 |
| 2013/0070238 A1* | 3/2013 | Fasse | G01S 7/486 356/138 |

* cited by examiner

*Primary Examiner* — Mark Hellner
(74) *Attorney, Agent, or Firm* — Lando & Anastasi, LLP

(57) ABSTRACT

A multi-function sensor system including an auto-alignment system. The multi-function sensor system includes a laser module configured to provide a transmit beam and an auto-alignment beam, a shared aperture component, a first channel configured to direct the transmit beam and the auto-alignment beam to the shared aperture component, a second channel configured to receive the transmit beam from the shared aperture component and provide a receive beam to the shared aperture component, and a third channel including a passive imager configured to receive the auto-alignment beam and a first portion of the receive beam from the shared aperture component, wherein the auto-alignment beam propagates through the passive imager to provide an indication of a line of sight (LOS) of the transmit beam relative to a field of view (FOV) of the passive imager.

24 Claims, 3 Drawing Sheets

WFOV BACKWARD-PROPAGATING ACTIVE-TO-PASSIVE AUTOALIGNMENT SYSTEM

BACKGROUND

1. Field

Embodiments of the disclosure relate generally to auto-alignment systems and more particularly auto-alignment systems in multi-function sensor systems.

2. Discussion of Related Art

As is known in the art, multi-function sensor systems can include both active and passive sensor functions. In some cases, auto-alignment systems can be used to provide critical relative boresight (i.e., line of sight (LOS)) knowledge of the various functions. However, in many cases, such auto-alignment systems operate over a limited field of view (FOV) and can include undesired aperture obscurations. In addition, such auto-alignment systems often employ small beams that do not sample the full aperture and may require the use of additional auxiliary local alignment loops (or paths) to establish the relative LOS relationship between the various sensor functions.

SUMMARY

At least one aspect of the present disclosure is directed to a multi-function sensor system including an auto-alignment system. The multi-function sensor system includes a laser module configured to provide a transmit beam and an auto-alignment beam, a shared aperture component, a first channel configured to direct the transmit beam and the auto-alignment beam to the shared aperture component, a second channel configured to receive the transmit beam from the shared aperture component and provide a receive beam to the shared aperture component, and a third channel including a passive imager configured to receive the auto-alignment beam and a first portion of the receive beam from the shared aperture component, wherein the auto-alignment beam propagates through the passive imager to provide an indication of a line of sight (LOS) of the transmit beam relative to a field of view (FOV) of the passive imager.

In one embodiment, the transmit beam corresponds to an actively steered transmit beam function of the multi-function sensor system and the passive imager corresponds to a passive function of the multi-function sensor system. In some embodiments, the transmit beam propagates in a first direction through the second channel and the auto-alignment beam propagates in a second direction opposite to the first direction through the passive imager of the third channel. In various embodiments, the multi-function sensor system includes at least one first focal plane array (FPA) configured to receive the first portion of the receive beam from the passive imager and a position sensing detector (PSD) configured to receive the auto-alignment beam from the passive imager, the PSD being substantially the same size as the at least one first FPA. In certain embodiments, the shared aperture component is configured to reflect the transmit beam to the second channel, split the receive beam into the first and second portions with the first portion directed to the third channel and the second portion directed to the first channel, and transmit the auto-alignment beam to the third channel.

In some embodiments, the shared aperture component is a dichroic beam splitter. In one embodiment, the multi-function sensor system includes a corner cube, wherein the auto-alignment beam is transmitted through the shared aperture component, reflected by the corner cube, and reflected off a back side of the shared aperture component towards the third channel. In various embodiments, the reflection of the auto-alignment beam by the corner cube and the shared aperture component provides an accurate sampling of the shared aperture component over a wide FOV. In certain embodiments, the laser module includes a laser source configured to provide the transmit beam and an auto-alignment source configured to provide the auto-alignment beam.

In various embodiments, the auto-alignment source is an incoherent light source. In some embodiments, the laser module is configured to align the transmit beam and the auto-alignment beam prior to providing the transmit beam and the auto-alignment beam to the first channel. In one embodiment, the laser module includes a second FPA configured to receive the second portion of the receive beam from the shared aperture component. In certain embodiments, the laser module is configured to align the auto-alignment beam to the second FPA. In some embodiments, the laser module includes a T/R switch configured as one of a quarter-wave plate and a mirror assembly including a through-hole.

Another aspect of the present disclosure is directed to a method of determining a line of sight (LOS) of an active function of a multi-function sensor system relative to a field of view (FOV) of a passive function of the multi-function sensory system. The method includes providing, via a laser module, a transmit beam and an auto-alignment beam, directing, via a first channel, the transmit beam and the auto-alignment beam to a shared aperture component, reflecting, via the shared aperture component, the transmit beam to a second channel, receiving, via the shared aperture component, a receive beam from the second channel, and providing, via the shared aperture component, the auto-alignment beam and a first portion of the receive beam to a third channel, the third channel including a passive imager, wherein the auto-alignment beam propagates through the passive imager to provide an indication of the LOS of the transmit beam relative to the FOV of the passive imager.

In one embodiment, the transmit beam propagates in a first direction through the second channel and the auto-alignment beam propagates through the passive imager of the third channel in a second direction opposite to the first direction. In some embodiments, the method includes providing, via the passive imager, the first portion of the receive beam to at least one first focal plane array (FPA) and providing, via the passive imager, the auto-alignment beam to a position sensing detector (PSD), the PSD being substantially the same size as the at least one first FPA. In various embodiments, providing the auto-alignment beam to the third channel includes transmitting the auto-alignment beam through the shared aperture component, reflecting the auto-alignment beam from a corner cube, and reflecting the auto-alignment beam off a back side of the shared aperture component towards the third channel. In certain embodiments, the reflection of the auto-alignment beam by the corner cube and the shared aperture component provides an accurate sampling of the shared aperture component over a wide FOV.

In some embodiments, the method includes providing the auto-alignment beam as an incoherent light beam. In one embodiment, providing the transmit beam and the autoalignment beam includes aligning the transmit beam and the auto-alignment beam prior to providing the transmit beam and the auto-alignment beam to the first channel. In various embodiments, the method includes providing, via the first channel, a second portion of the receive beam from the shared aperture component to a second FPA included in the laser module. In certain embodiments, the method includes aligning the auto-alignment beam to the second FPA with the laser module.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, multi-function sensor systems can include both active and passive sensor functions. In some cases, auto-alignment systems can be used to provide relative boresight knowledge of the various functions. Such auto-alignment systems often utilize forward propagating configurations to provide micro-radian pointing accuracy of the active sensor function to a target location viewed on a passive tracker focal plane array (FPA).

In many cases, these types of auto-alignment systems may operate with performance limitations or restrictions. For example, such auto-alignment systems may include multiple (e.g., two) auto-alignment beams and/or rely on the alignment of multiple (e.g., two) FPAs. The multiple FPAs may be separated by significant distances and utilize auxiliary optical paths that are not used by the active or passive functions of the multi-function sensor. As such, these auto-alignment systems may introduce additional error sources, degrading performance of the multi-function sensor. In addition, such auto-alignment systems may operate over a limited field of view (FOV) and can include undesired aperture obscurations. For example, these auto-alignment systems may utilize pencil beams or sub-aperture beams, providing alignment over a limited FOV with reduced accuracy.

Accordingly, an improved, auto-alignment system for multi-function sensor systems is provided herein. In at least one embodiment, the auto-alignment system utilizes a backward propagating configuration to provide alignment of active and passive sensor functions over a wide field of view (WFOV). In some examples, the backward propagating configuration of the auto-alignment system includes a single auto-alignment beam and maximizes use of common all-reflective optical paths in the multi-function sensor system to minimizes potential error sources.

Figure 1:
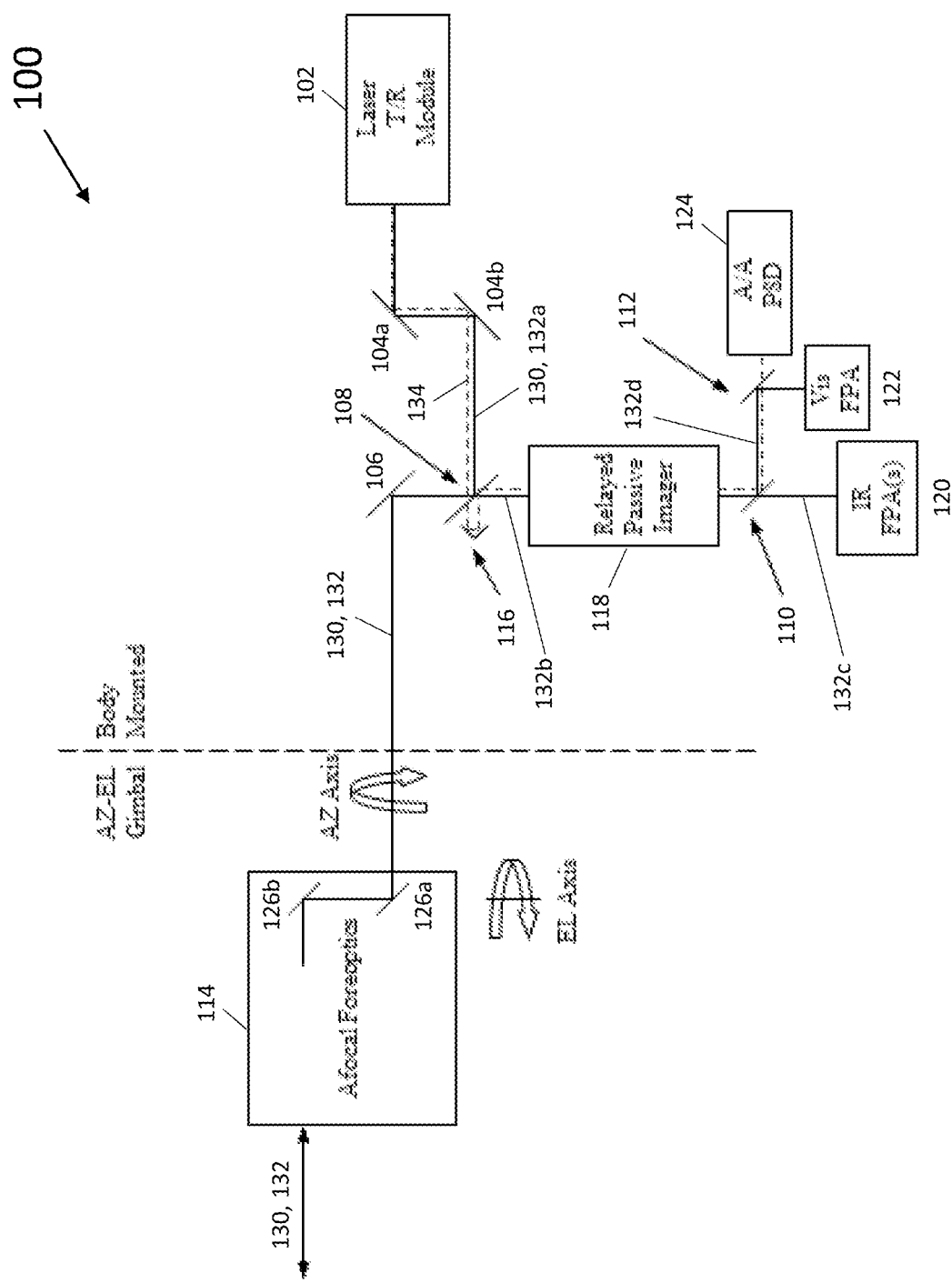
FIG. 1 is a functional block diagram illustrating a multi-function sensor system in accordance with aspects described herein.

FIG. 1 illustrates a functional block diagram of a multi-function sensor system 100 in accordance with aspects described herein. In one example, the sensor system 100 includes a laser transmit/receive (T/R) module 102, a first beam steering mirror (BSM) 104a, a second BSM 104b, a third BSM 106, a first beam splitter 108, a second beam splitter 110, a third beam splitter 112, an afocal foreoptics module 114, a corner cube 116, a relayed passive imager (RPI) 118, a first FPA 120, a second FPA 122, and an auto-alignment (A/A) position sensing device (PSD) 124.

In some examples, the first beam splitter 108, the second beam splitter 110, and the third beam splitter 112 may each be configured as dichroic beam splitters. For example, each of the beam splitters 108, 110, and 112 may reflect some spectral region(s) of light and transmit others.

In one example, a controller may be used to operate or control the components of the sensor system 100 (e.g., the BSMs 104a, 104b, 106). The controller may correspond to one or more general computing processors, specialized processors, or microcontrollers. In certain examples, the controller may include programmed, special-purpose hardware, for example, an application-specific integrated circuit (ASIC), or more generally designed hardware, such as a field programmable gate array (FPGA) or a general-purpose processor. In various examples, the controller may include one or more memory devices, such as a disk drive, memory, flash memory, embedded or on-chip memory, or other device for storing data.

In one example, the sensor system 100 is configured with an active sensor function and a passive sensor function. For example, the active sensor function includes the laser T/R module 102 and the passive sensor function includes the first FPA 120, the second FPA 122, and the A/A PSD 124. In some examples, the active and passive sensor functions may utilize one or more channels of the sensor system 100. For example, the first BSM 104a and the second BSM 104b may correspond to a first channel of the sensor system 100. Likewise, the third BSM 106 and the afocal foreoptics module 114 may correspond to a second channel of the sensor system 100. In addition, the second beam splitter 110, the third beam splitter 112, and the RPI 118 may correspond to a third channel of the sensor system 100. In some examples, the first beam splitter 108 is a shared aperture component utilized by the first, second, and third channels.

In one example, the laser T/R module 102 is configured to provide a transmit beam 130. As shown, the transmit beam 130 is directed (or reflected) by the first BSM 104a, the second BSM 104b, and the first beam splitter 108 to the third BSM 106. The transmit beam 130 is reflected by the third BSM 106 towards the afocal foreoptics module 114. In one example, the afocal foreoptics module is configured to direct the transmit beam 130 out of the sensor system 100 towards a surveillance area and/or target(s).

In certain examples, the afocal foreoptics module 114 functions similar to a telescope to observe the surveillance area and/or target(s). In some examples, the afocal foreoptics module 114 is mounted to gimbal (not shown). As such, the gimbal may be actuated to orient the afocal foreoptics module 114 relative to at least one axis (e.g., Az, El, etc.).

In some examples, the afocal foreoptics module 114 is configured to receive a receive beam 132. As shown, the receive beam 132 is directed by the third BSM 106 to the first beam splitter 108. The first beam splitter 108 is configured to split the receive beam 132 into a first portion 132a and a second portion 132b. In some examples, the receive beam 132 is separated into the first and second portions 132a, 132b on the basis of differing wavelengths. For example, the first portion 132a may have a different wavelength than the second portion 132b. In one example, the first portion of the receive beam 132a is reflected by the first beam splitter 108 towards the first channel and the second portion of the receive beam 132b is transmitted by the first beam splitter 108 towards the third channel.

For example, as shown, the first portion of the receive beam 132a is directed from the first beam splitter 108 to the first and second BSMs 104a, 104b and is provided to the laser T/R module. Likewise, the second portion of the receive beam 132b is provided to the RPI 118. In one example, the RPI 118 is an all-reflective imager. In some examples, the RPI 118 functions similar to a camera by focusing the second portion of the receive beam 132b to form an image. The output of the RPI 118 (i.e., the second portion 132b) is provided to the second beam splitter 110. The second beam splitter 110 is configured to split the second portion of the receive beam 132b into a third portion 132c and a fourth portion 132d. The third portion 132c is provided to a first FPA 120 and the fourth portion 132d is directed to the third beam splitter 112. The third beam splitter 112 is configured to direct the fourth portion 132d to the second FPA 122.

In some examples, the first FPA 120 and the second FPA 122 may be configured to receive specific types (or spectrums) of light. For example, the first FPA 120 may be configured to receive infrared (IR) light and the second FPA 122 may be configured to receive visible light. In other examples, the first FPA 120 or the second FPA 122 may be optional or may be configured differently (e.g., different spectrum).

In one example, in addition to the transmit beam 130, the laser T/R module 102 is configured to provide an auto-alignment (A/A) beam 134 that is accurately aligned to the transmit beam 130. In certain examples, the A/A beam 134 is aligned to the active transmitter and active receiver included in the laser T/R module 102. In some examples, the A/A beam 134 is provided from an incoherent source included in the laser T/R module 102 (e.g., an LED diode). As shown, the A/A beam 134 is directed by the first BSM 104a and the second BSM 104b to the first beam splitter 108. In one example, the first beam splitter 108 is sampled in reflection (as it is used by the transmit beam 130) by transmission of the A/A beam 134, the reflection of the A/A beam 134 by the corner cube 116, and the subsequent reflection of the A/A beam 134 off the backside of the first beam splitter 108. In some examples, the corner cube 116 allows the first beam splitter 108 to be sampled over a WFOV. As such, the A/A beam 134 samples the true line-of-sight (LOS) of the active function (i.e., the transmit beam 130). Once reflected off the backside of the first beam splitter 108, the A/A beam 134 is provided to the RPI 118.

In one example, the RPI 118 may function similar to a camera by focusing the A/A beam 134 to form an image. The output of the RPI 118 (i.e., the A/A beam 134) is provided to the second beam splitter 110. In one example, the A/A beam 134 is reflected by the second beam splitter 110 to the third beam splitter 112 and is transmitted through the third beam splitter 112 to the A/A PSD 124.

In some examples, the A/A PSD 124 is substantially the same size as the passive FPAs (i.e., the first and second FPAs 120, 122). Likewise, the A/A PSD 124 and the passive FPAs may be closely positioned (e.g., within several inches), and in some case, held together via a rigid mechanical structure.

In one example, the BSMs in the first channel (e.g., the first and second BSMs 104a, 104b) can be used to independently steer the transmit beam 130 within the FOV of the passive FPAs. In some examples, the BSMs in the first channel may be controlled to steer the transmit beam 130 to various targets sensed in the passive FOV. Being that the first and second BSMs 104a, 104b are also used to direct the A/A beam 134, the steering motion of the transmit beam 130 can be sensed in the A/A PSD 124.

As such, the LOS (or relative boresight) of the active function can be determined relative to the FOV of the passive FPAs (i.e., the passive function). In some examples, once determined, the relative boresight of the active function may be used to adjust the pointing angle or direction of the transmit beam 130. For example, the first and second BSMs 104a, 104b may be used to independently steer the transmit beam 130 based on the determined relative boresight of the active function.

As shown in FIG. 1, the A/A beam 134 propagates backwards through the shared RPI 118 to the A/A PSD 124 with the second portion of the receive beam 132b (provided to the FPAs 120, 122). As such, being that the all-reflective path through the RPI 118 is shared by the A/A beam 134 and the second portion of the receive beam 132b, there is no need for a dedicated path for the A/A beam 134 and error sources in the sensor system 100 can be minimized. In addition, use of the all-reflective optical path allows for optimal choice of A/A source wavelength. In some examples, the A/A source may be selected such that the A/A beam 134 is a full-aperture beam configured to provide a true sampling of the active function LOS.

As described above, the components of the sensor system 100 correspond to an active function and a passive function. Being that the first channel and the third channel are shared by the laser beams (i.e., 130, 132) and the A/A beam 134, errors in the sensor system 100 may be traced to specific channels (or regions) of the sensor system 100 by monitoring the passive FPAs (i.e., the first and second FPAs 120, 122) and the A/A PSD 124. For example, if an error is detected on the A/A PSD 124 (e.g., based on A/A beam movement) but is not detected on the passive FPAs, it may be determined that the error source is located in the first channel (including the first beam splitter 108). Likewise, if an error is detected on the passive FPAs (e.g., based on a scene movement) and on the A/A PSD 124, it may be determined that the error source is located in the third channel in the path back of the beam splitter 108. Similarly, if an error is detected on the passive FPAs but not on the A/A PSD 124, it may be determined that the error source is located in the second channel in the path forward of the beam splitter 108.

The ability to trace errors to specific channels or regions of the sensor system 100 allows for quick error corrections with improved accuracy and predictability. For example, once the location of the error source is known, the error may be corrected by adjusting or controlling one of the BSMs in the sensor system (i.e., BSMs 104*a*, 104*b*, 106).

As described above, the A/A beam 134 is aligned to the active function of the sensor system 100 within the laser T/R module 102. For example, the A/A beam 134 may be aligned with the transmit beam 130 and to the active receiver configured to receive the first portion of the receive beam 132*a* (within the laser T/R module 102).

Figure 2:
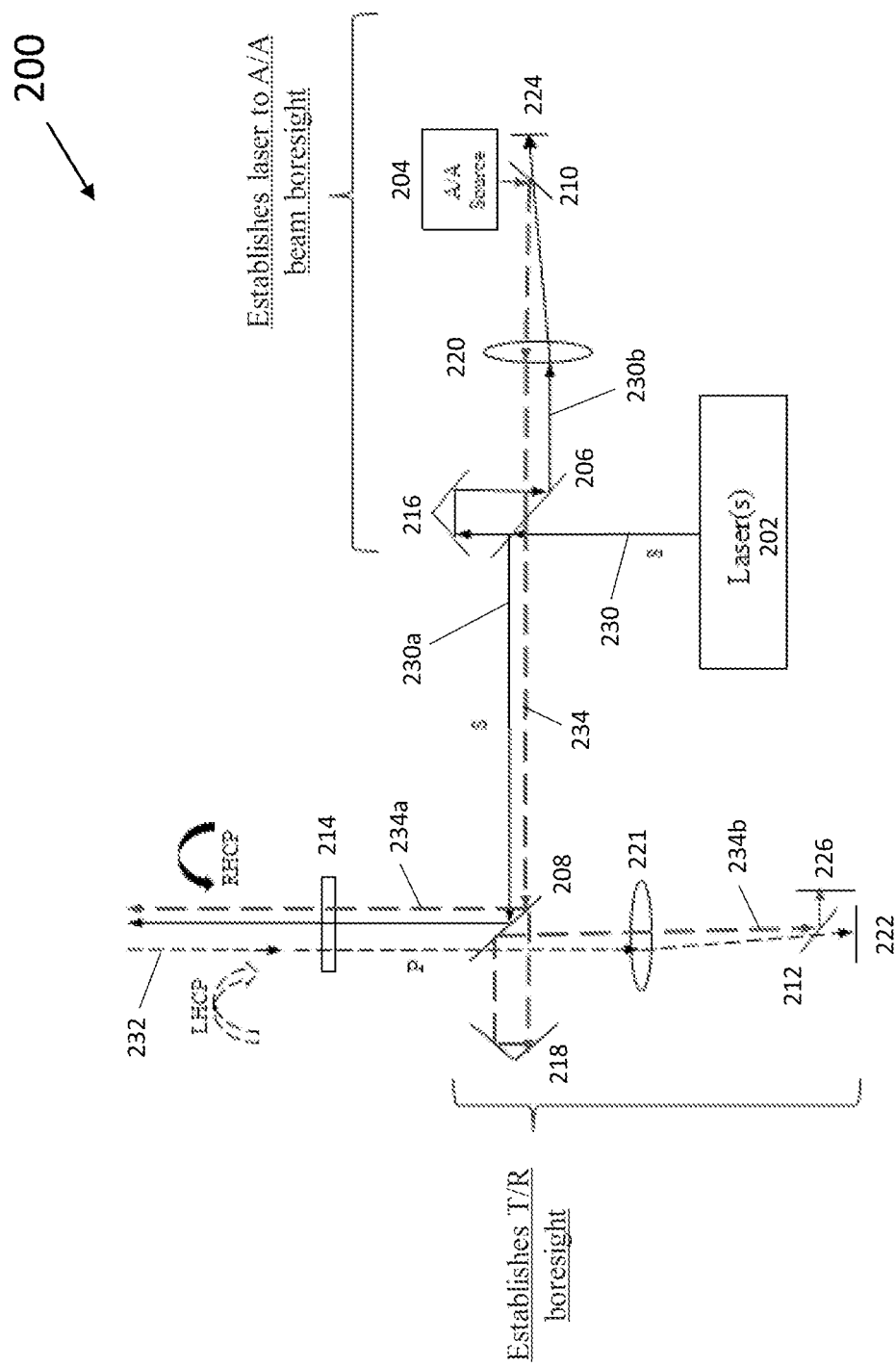
FIG. 2 is a functional block diagram illustrating a transmit/receive module in accordance with aspects described herein.

FIG. 2 illustrates a functional block diagram of a laser T/R module 200 in accordance with aspects described herein. In some examples, the laser T/R module 200 corresponds to the laser T/R module 102 of the multi-function sensor system 100 of FIG. 1. In one example, the laser T/R module 200 includes a laser source 202, an A/A source 204, a first beam splitter 206, a second beam splitter 208, a third beam splitter 210, a fourth beam splitter 212, a quarter-wave plate 214, a first corner cube 216, a second corner cube 218, a collimator 220, an imager 221, a receiver FPA 222, a first PSD 224, and a second PSD 226.

In one example, the first beam splitter 206, the second beam splitter 208, the third beam splitter 210, and the fourth beam splitter 212 may each be configured as dichroic beam splitters. For example, each of the beam splitters 206, 208, 210, and 212 may reflect some spectral region(s) of light and transmit others. In certain examples, the second beam splitter 208 may be a polarization beam splitter configured to reflect certain polarizations and transmit others.

In some examples, the laser source 202 is configured to provide a transmit beam 230. In some examples, the laser source 202 may be any type of coherent light source and may include internal beam shaping and pre-expansion capabilities. In addition, the laser source 202 may be configured to provide the transmit beam 230 with a specific polarization. For example, the transmit beam 230 may be provided by the laser source 202 with a linear polarization (e.g., s-polarization).

As shown, the transmit beam 230 is provided to the first beam splitter 206, and the first beam splitter 206 is configured to split the transmit beam 230 into a first portion 230*a* and a second portion 230*b*. In some examples, the first portion of the transmit beam 230*a* is reflected to the second beam splitter 208. The second beam splitter 208 is configured to reflect the first portion of the transmit beam 230*a* towards the quarter-wave plate 214. In one example, the quarter-wave plate 214 is configured to convert the first portion of the transmit beam 230*a* from a linear polarization to a circular polarization. For example, after passing through the quarter-wave plate 214, the first portion of the transmit beam 230*a* may have a right hand circular polarization (RHCP). In other examples, a different polarization scheme may be used. After passing through the quarter-wave plate 214, the first portion of the transmit beam 230*a* is directed out of the laser T/R module 200. In some examples, the first portion of the transmit beam 230*a* is provided to the first channel of the sensor system 100 (as the transmit beam 130).

Likewise, the second portion of the transmit beam 230*b* is provided to the first corner cube 216 and reflected off the backside of the first beam splitter 206 towards the collimator 220. The second portion of the transmit beam 230*b* is directed towards the third beam splitter 210 and is transmitted through the third beam splitter 210 to the first PSD 224. In some examples, the first beam splitter 206 is sampled in reflection (as it is used by the transmit beam 230) by transmission of the second portion of the transmit beam 230*b*, the reflection of the second portion of the transmit beam 230*b* by the first corner cube 216, and the subsequent reflection of the second portion of the transmit beam 230*b* off the backside of the first beam splitter 206. As such, the image received at the first PSD 224 may be used to determine (or establish) the boresight of the laser source 202.

In one example, the laser T/R module 200 is configured to receive a receive beam 232 (e.g., the first portion of the receive beam 132*a* of FIG. 1). As shown, the receive beam 232 may have a left hand circular polarization (LHCP), having initially been RHCP on transmission, but switching to LHCP on reflection from a target object. As such, the quarter-wave plate 214 may be configured to convert the receive beam 232 from a circular polarization to a linear polarization (e.g., p-polarization). After passing through the quarter-wave plate 214, the receive beam 232 is directed to the second beam splitter 208 and is transmitted through the second beam splitter 208 to the imager 221. The receive beam 232 is directed towards the fourth beam splitter 212 and transmitted through the fourth beam splitter 212 to the receiver FPA 222. Simultaneously, the second PSD 226 records the angular position of the A/A beam 234. As such, there is precise knowledge of the relative boresight of the transmitter (i.e., transmit beam 230) and the receiver (i.e., receive beam 232).

In addition, the A/A source 204 is configured to provide an A/A beam 234. In some examples, the A/A source 204 is an incoherent light source (e.g., an LED diode). As shown, the A/A beam 234 is reflected off the third beam splitter 210, transmitted through the collimator 220 and the first beam splitter 206, and directed to the second beam splitter 208. As described above, the first PSD 224 may be used to determine the boresight of the laser source 202. In some examples, being that the A/A source 204 and the first PSD 224 are both conjugate at the focus of the collimator 220, there is precise knowledge of the relative LOS directions of the first portion of the transmit beam 230*a* and the A/A beam 234. As such, the A/A beam 234 may be aligned to the boresight of the laser source 202. In certain examples, the A/A beam 234 may be adjusted such that the A/A beam 234 and the first portion of the transmit beam 230*a* are substantially aligned at the second beam splitter 208.

In one example, the second beam splitter 208 is configured to split the A/A beam 234 into a first portion of the A/A beam 234*a* and a second portion of the A/A beam 234*b*. The first portion of the A/A beam 234*a* is transmitted through the quarter-wave plate 214 and directed out of the laser T/R module 200. In some examples, the first portion of the A/A beam 234*a* is provided to the first channel of the sensor system 100 (as the A/A beam 134).

Likewise, the second portion of the A/A beam 234*b* is provided to the second corner cube 218 and reflected off the backside of the second beam splitter 208 towards the imager 221. The second portion of the A/A beam 234*b* is directed towards the fourth beam splitter 212 and is provided to the second PSD 226. The second beam splitter 208 is sampled in reflection (as it is used by the first portion of the transmit beam 230*a*) by transmission of the second portion of the A/A beam 234*b*, the reflection of the second portion of the A/A beam 234*b* by the second corner cube 218, and the subsequent reflection of the second portion of the A/A beam 234*b* off the backside of the second beam splitter 208. As such, the image received at the second PSD 226 may be used to determine (or establish) the T/R boresight of the laser T/R module 200 (e.g., the boresight of FPA receiver 222). In certain examples, the image received at the second PSD 226 may be used to align the second portion of the A/A beam 234*b* with the FPA receiver 222.

In one example, the image received at the second PSD 226 may be used to determine where the active function of the sensor system 100 is pointing. In some examples, components of the sensor system 100 (e.g., BSMs 104*a*, 104*b*) may be controlled to steer the active function of the sensor system 100 relative to targets viewed in the passive FPAs (e.g., 120, 122).

Figure 3:
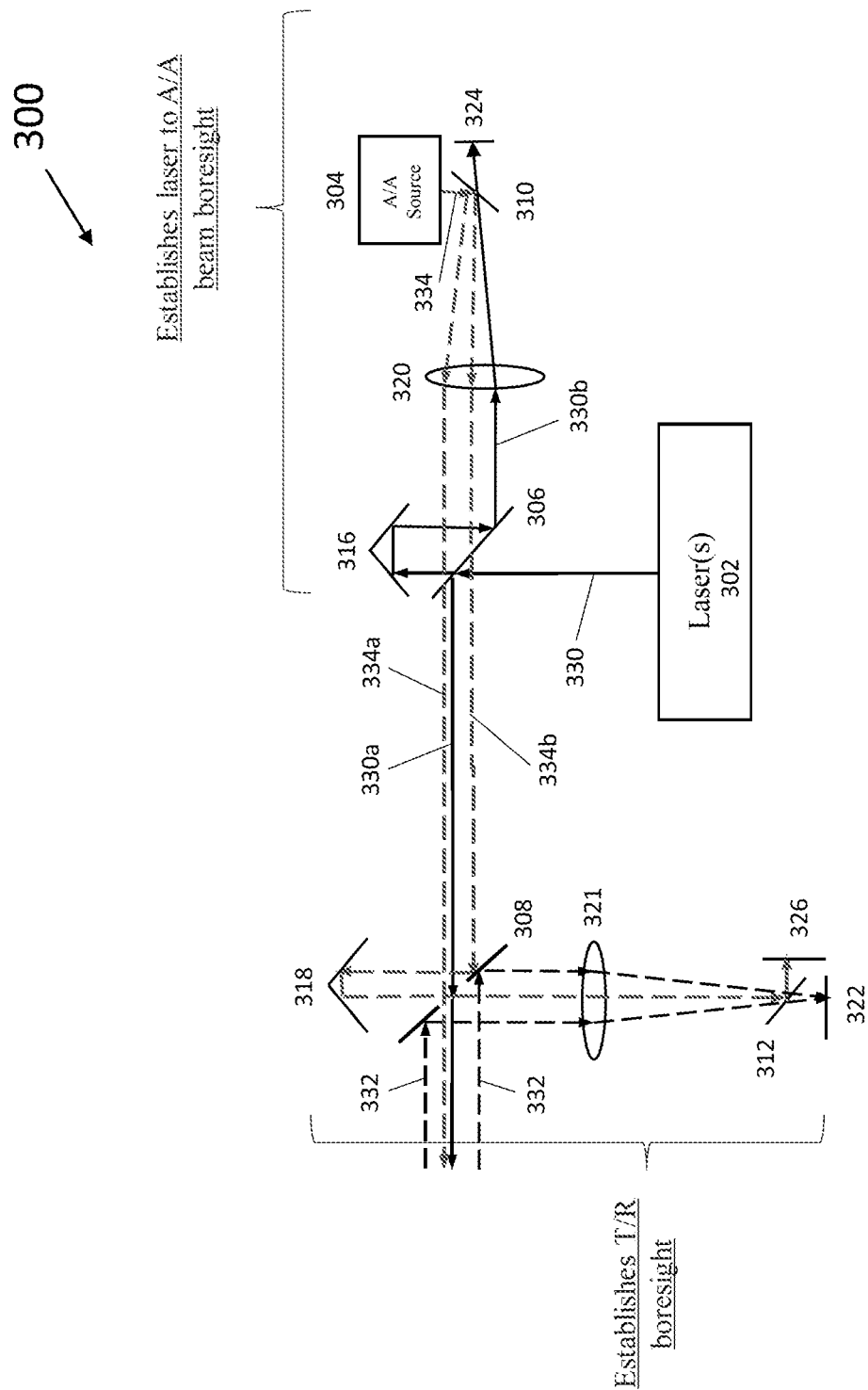
FIG. 3 is a functional block diagram illustrating a transmit/receive module in accordance with aspects described herein.

FIG. 3 illustrates a functional block diagram of another laser T/R module 300 in accordance with aspects described herein. In some examples, the laser T/R module 300 corresponds to the laser T/R module 102 of the multi-function sensor system 100 of FIG. 1. In one example, the laser T/R module 300 includes a laser source 302, an A/A source 304, a first beam splitter 306, a mirror assembly 308, a second beam splitter 310, a third beam splitter 312, a first corner cube 316, a second corner cube 318, a collimator 320, an imager 321, a receiver FPA 322, a first PSD 324, and a second PSD 326.

In some examples, the first beam splitter 306, the second beam splitter 310, and the third beam splitter 312 may each be configured as dichroic beam splitters. For example, each of the beam splitters 306, 310, and 312 may reflect some spectral region(s) of light and transmit others.

In one example, the laser source 302 is configured to provide a transmit beam 330. In some examples, the laser source 302 may be any type of coherent light source and may include internal beam shaping and pre-expansion capabilities. As shown, the transmit beam 330 is provided to the first beam splitter 306, and the first beam splitter 306 is configured to split the transmit beam 330 into a first portion 330*a* and a second portion 330*b*.

The first portion of the transmit beam 330*a* is reflected to the mirror assembly 308. The mirror assembly 308 includes a through-hole (e.g., a holey mirror). In one example, the first portion of the transmit beam 330*a* is transmitted out of the laser T/R module 300 via the through-hole of the mirror assembly 308. In some examples, the first portion of the transmit beam 330*a* is provided to the first channel of the sensor system 100 (as the transmit beam 130 of FIG. 1).

Likewise, the second portion of the transmit beam 330*b* is provided to the first corner cube 316 and reflected off the backside of the first beam splitter 306 towards the collimator 320. The second portion of the transmit beam 330*b* is directed towards the second beam splitter 310 and is transmitted through the second beam splitter 310 to the first PSD 324. In some examples, the first beam splitter 306 is sampled in reflection (as it is used by the transmit beam 330) by transmission of the second portion of the transmit beam 330*b*, the reflection of the second portion of the transmit beam 330*b* by the first corner cube 316, and the subsequent reflection of the second portion of the transmit beam 330*b* off the backside of the first beam splitter 306. As such, the image received at the first PSD 324 may be used to determine (or establish) the boresight of the laser source 302.

In one example, the laser T/R module 300 is configured to receive a receive beam 232 (e.g., the first portion of the receive beam 132*a* of FIG. 1). The receive beam 332 is reflected off the mirror assembly 308 and directed towards the imager 321. The receive beams 332 is directed towards the third beam splitter 312 and transmitted through the third beam splitter 312 to the receiver FPA 322.

In addition, the A/A source 304 is configured to provide an A/A beam 334. In some examples, the A/A source 304 is an incoherent light source (e.g., an LED diode). As shown, the A/A beam 334 is split by the second beam splitter 310 into a first portion of the A/A beam 334*a* and a second portion of the A/A beam 334*b*. Both the first and second portions of the A/A beam 334*a*, 334*b* are transmitted through the collimator 320 and the first beam splitter 306 and provided to the mirror assembly 308. As described above, the first PSD 324 may be used to determine the boresight of the laser source 302. As such, the first and second portions of the A/A beam 334*a*, 334*b* may be aligned to the boresight of the laser source 302. In some examples, the first and second portions of the A/A beam 334*a*, 334*b* may be adjusted such that the first and second portions of the A/A beam 334*a*, 334*b* and the first portion of the transmit beam 330*a* are substantially aligned at the mirror assembly 308.

In one example, the first portion of the A/A beam 334*a* is transmitted through the through-hole of the mirror assembly 308 and out of the laser T/R module 300. In some examples, the first portion of the A/A beam 334*a* is provided to the first channel of the sensor system 100 (as the A/A beam 134 of FIG. 1). Likewise, the second portion of the A/A beam 334*b* is reflected off the mirror assembly 308 towards the second corner cube 318 and transmitted back through the through-hole of the mirror assembly 308 towards the imager 321. The second portion of the A/A beam 334*b* is then directed towards the third beam splitter 312 and is provided to the second PSD 326. In some examples, the mirror assembly 308 is sampled in reflection (as it is used by the receive beam 332) by reflection of the second portion of the A/A beam 334*b*. As such, the image received at the second PSD 326 may be used to determine (or establish) the T/R boresight of the laser T/R module 300 (e.g., the boresight of the receiver FPA 322). In certain examples, the image received at the second PSD 326 may be used to align the second portion of the A/A beam 334*b* with the FPA receiver 322.

In one example, the image received at the second PSD 326 may be used to determine where the active function of the sensor system 100 is pointing. In some examples, components of the sensor system 100 (e.g., BSMs 104*a*, 104*b*, 106) may be controlled to steer the active function of the sensor system 100 relative to the T/R boresight of the laser module 300 and/or targets viewed in the passive FPAs (e.g., 120, 122).

As described above, an improved, auto-alignment system for multi-function sensor systems is provided herein. In at least one embodiment, the auto-alignment system utilizes a backward propagating configuration to provide alignment of active and passive sensor functions over a WFOV. In some examples, the backward propagating configuration of the auto-alignment system includes a single auto-alignment beam and maximizes use of common all-reflective optical paths in the multi-function sensor system to minimizes potential error sources.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A multi-function sensor system including an auto-alignment system, the multi-function sensor system comprising:
   a laser module configured to provide a transmit beam and an auto-alignment beam, the laser module including:
      a separation apparatus configured to separate the transmit beam into a first portion that is directed out of the laser module and a second portion that is directed through a collimator and to a position sensing device within the laser module; and
      an auto-alignment beam source, the auto-alignment beam source and the position sensing device being conjugate at a focus of the collimator;
   a shared aperture component;
   a first channel configured to direct the first portion of the transmit beam and the auto-alignment beam to the shared aperture component;
   a second channel configured to receive the first portion of the transmit beam from the shared aperture component and provide a receive beam to the shared aperture component; and
   a third channel including a passive imager configured to receive the auto-alignment beam and a first portion of the receive beam from the shared aperture component,
   wherein the auto-alignment beam propagates through the passive imager to provide an indication of a line of sight (LOS) of the first portion of the transmit beam relative to a field of view (FOV) of the passive imager.

2. The multi-function sensor system of claim 1, wherein the first portion of the transmit beam corresponds to an actively steered transmit beam function of the multi-function sensor system and the passive imager corresponds to a passive function of the multi-function sensor system.

3. The multi-function sensor system of claim 1, wherein the first portion of the transmit beam propagates in a first direction through the second channel and the auto-alignment beam propagates in a second direction opposite to the first direction through the passive imager of the third channel.

4. The multi-function sensor system of claim 1, further comprising:
   at least one first focal plane array (FPA) configured to receive the first portion of the receive beam from the passive imager; and
   a position sensing detector (PSD) configured to receive the auto-alignment beam from the passive imager, the PSD being the same size as the at least one first FPA.

5. The multi-function sensor system of claim 4, wherein the shared aperture component is configured to reflect the first portion of the transmit beam to the second channel, split the receive beam into the first and second portions with the first portion directed to the third channel and the second portion directed to the first channel, and transmit the auto-alignment beam to the third channel.

6. The multi-function sensor system of claim 5, wherein the shared aperture component is a dichroic beam splitter.

7. The multi-function sensor system of claim 5, further comprising a corner cube, wherein the auto-alignment beam is transmitted through the shared aperture component, reflected by the corner cube, and reflected off a back side of the shared aperture component towards the third channel.

8. The multi-function sensor system of claim 7, wherein the reflection of the auto-alignment beam by the corner cube and the shared aperture component provides an accurate sampling of the shared aperture component over a wide FOV.

9. The multi-function sensor system of claim 5, wherein the laser module includes a laser source configured to provide the transmit beam.

10. The multi-function sensor system of claim 1, wherein the auto-alignment source is an incoherent light source.

11. The multi-function sensor system of claim 1, wherein the laser module is configured to align the first portion of the transmit beam and the auto-alignment beam prior to providing the first portion of the transmit beam and the auto-alignment beam to the first channel.

12. A multi-function sensor system including an auto-alignment system, the multi-function sensor system comprising:
   a laser module configured to provide a transmit beam and an auto-alignment beam;
   a shared aperture component;
   a first channel configured to direct the transmit beam and the auto-alignment beam to the shared aperture component;
   a second channel configured to receive the transmit beam from the shared aperture component and provide a receive beam to the shared aperture component;
   a third channel including a passive imager configured to receive the auto-alignment beam and a first portion of the receive beam from the shared aperture component;
   at least one first focal plane array (FPA) configured to receive the first portion of the receive beam from the passive imager; and
   a position sensing detector (PSD) configured to receive the auto-alignment beam from the passive imager, the PSD being the same size as the at least one first FPA,
   wherein the auto-alignment beam propagates through the passive imager to provide an indication of a line of sight (LOS) of the transmit beam relative to a field of view (FOV) of the passive imager,
   wherein the shared aperture component is configured to reflect the transmit beam to the second channel, split the receive beam into the first and second portions with the first portion directed to the third channel and the second portion directed to the first channel, and transmit the auto-alignment beam to the third channel,
   wherein the laser module includes a laser source configured to provide the transmit beam and an auto-alignment source configured to provide the auto-alignment beam, and
   wherein the laser module includes a second FPA configured to receive the second portion of the receive beam from the shared aperture component.

13. The multi-function sensor system of claim 12, wherein the laser module is configured to align the auto-alignment beam to the second FPA.

14. The multi-function sensor system of claim 12, wherein the laser module includes a T/R switch configured as one of a quarter-wave plate and a mirror assembly including a through-hole.

15. A method of determining a line of sight (LOS) of an active function of a multi-function sensor system relative to a field of view (FOV) of a passive function of the multi-function sensory system, the method comprising:
   providing, via a laser module, a transmit beam from a laser source within the laser module;
   providing an auto-alignment beam from an auto alignment source within the laser module;
   separating the transmit beam into a first portion that is directed out of the laser module and a second portion that is directed through a collimator within the laser module and to a position sensing device within the laser module, the auto-alignment beam source and the position sensing device being conjugate at a focus of the collimator;
directing, via a first channel, the first portion of the transmit beam and the auto-alignment beam to a shared aperture component;
reflecting, via the shared aperture component, the first portion of the transmit beam to a second channel;
receiving, via the shared aperture component, a receive beam from the second channel; and
providing, via the shared aperture component, the auto-alignment beam and a first portion of the receive beam to a third channel, the third channel including a passive imager,
wherein the auto-alignment beam propagates through the passive imager to provide an indication of the LOS of the first portion of the transmit beam relative to the FOV of the passive imager.

16. The method of claim 15, wherein the first portion of the transmit beam propagates in a first direction through the second channel and the auto-alignment beam propagates through the passive imager of the third channel in a second direction opposite to the first direction.

17. The method of claim 15, further comprising:
providing, via the passive imager, the first portion of the receive beam to at least one first focal plane array (FPA); and
providing, via the passive imager, the auto-alignment beam to a position sensing detector (PSD), the PSD being the same size as the at least one first FPA.

18. The method of claim 15, wherein providing the auto-alignment beam to the third channel includes transmitting the auto-alignment beam through the shared aperture component, reflecting the auto-alignment beam from a corner cube, and reflecting the auto-alignment beam off a back side of the shared aperture component towards the third channel.

19. The method of claim 15, wherein providing the transmit beam and the auto-alignment beam includes aligning the first portion of the transmit beam and the auto-alignment beam prior to providing the first portion of the transmit beam and the auto-alignment beam to the first channel.

20. A method of determining a line of sight (LOS) of an active function of a multi-function sensor system relative to a field of view (FOV) of a passive function of the multi-function sensory system, the method comprising:
providing, via a laser module, a transmit beam and an auto-alignment beam;
directing, via a first channel, the transmit beam and the auto-alignment beam to a shared aperture component;
reflecting, via the shared aperture component, the transmit beam to a second channel;
receiving, via the shared aperture component, a receive beam from the second channel;
providing, via the shared aperture component, the auto-alignment beam and a first portion of the receive beam to a third channel, the third channel including a passive imager; and
providing, via the first channel, a second portion of the receive beam from the shared aperture component to a second FPA included in the laser module,
wherein providing the transmit beam and the auto-alignment beam includes aligning the first portion of the transmit beam and the auto-alignment beam prior to providing the first portion of the transmit beam and the auto-alignment beam to the first channel, and
wherein the auto-alignment beam propagates through the passive imager to provide an indication of the LOS of the transmit beam relative to the FOV of the passive imager.

21. The method of claim 20, further comprising aligning the auto-alignment beam to the second FPA with the laser module.

22. The multi-function sensor system of claim 1, further comprising a second separation apparatus within the laser module configured to separate a transmit function of the laser module from a receive function of the laser module.

23. The multi-function sensor system of claim 22, wherein the second separation apparatus includes a polarization beam splitter.

24. The multi-function sensor system of claim 22, wherein the second separation apparatus includes a mirror having a hole configured to provide for passage of the first portion of the transmit beam through the mirror.

* * * * *